(No Model.) 2 Sheets—Sheet 1.
H. G. VAN EVEREN & J. HENDERSON.
DEVICE FOR REGULATING AND RELIEVING PRESSURE IN WATER PIPES.

No. 514,394. Patented Feb. 6, 1894.

Witnesses
Louis G. Julihn.
Orie G. Julihn.

Inventors
H. G. Van Everen
and Jas. Henderson
By Hopkins & Atkins
Attorneys (No Model.) 2 Sheets—Sheet 2.

H. G. VAN EVEREN & J. HENDERSON.
DEVICE FOR REGULATING AND RELIEVING PRESSURE IN WATER PIPES.

No. 514,394. Patented Feb. 6, 1894.

Witnesses
Louis G. Julihn.
Orie G. Julihn.

Inventors
H. G. Van Everen
and Jas. Henderson.
By Hopkins & Atkins
Attorneys

THE NATIONAL LITHOGRAPHING COMPANY,
WASHINGTON, D. C.

UNITED STATES PATENT OFFICE.

HORACE G. VAN EVEREN AND JAMES HENDERSON, OF THREE RIVERS, MICHIGAN.

DEVICE FOR REGULATING AND RELIEVING PRESSURE IN WATER-PIPES.

SPECIFICATION forming part of Letters Patent No. 514,394, dated February 6, 1894.

Application filed April 16, 1892. Serial No. 429,411. (No model.)

*To all whom it may concern:*

Be it known that we, HORACE G. VAN EVEREN and JAMES HENDERSON, of the city of Three Rivers, county of St. Joseph, Michigan, have invented certain new and useful Improvements in Devices for Regulating and Relieving Pressure in Water-Pipes Caused by the Sudden Stoppage of the Flow of Water Therein, of which the following is a specification.

The object of the invention is to produce an automatic and effectual means of relief of pressure in pipes occasioned by shutting off the flow of water therein, which in large pipes or mains frequently occasions fractures and injuries to the pipes.

The device is especially suitable for railway stand pipes, but may be employed for many other purposes.

Figure 1:
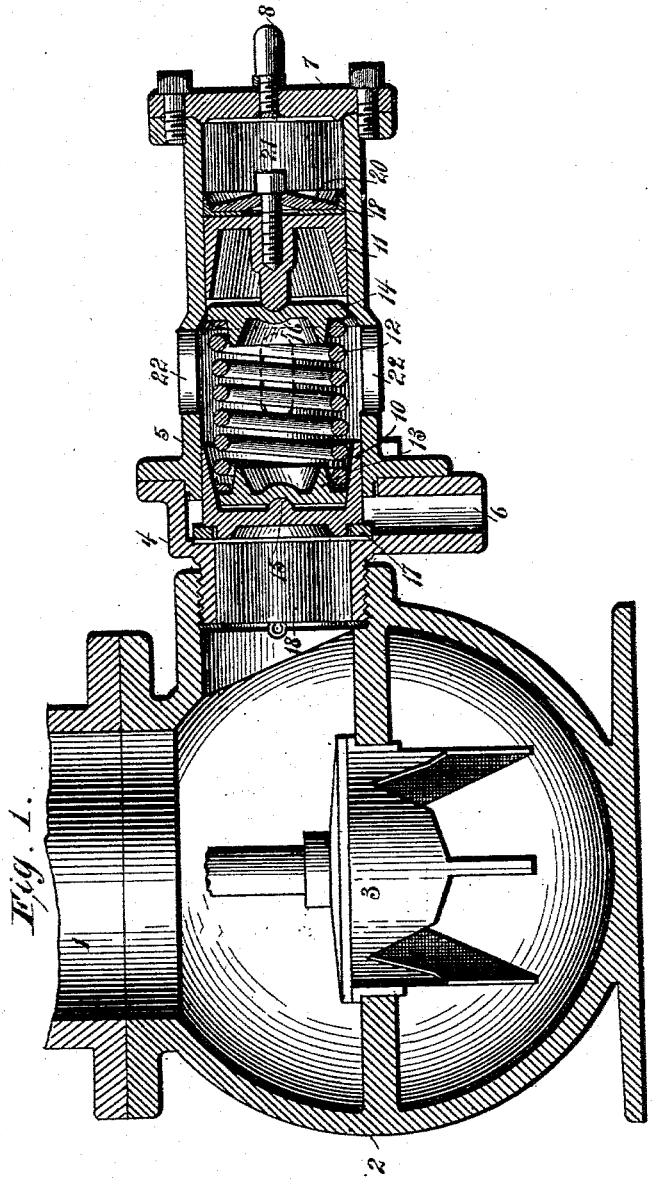
Figure 2:
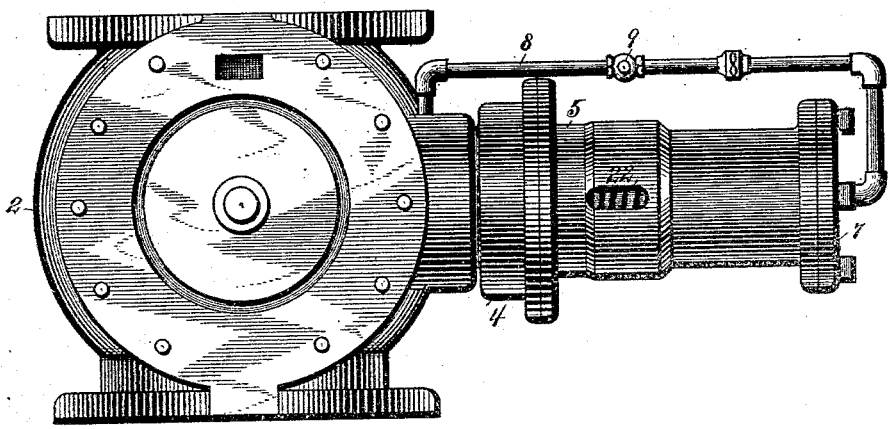
Figure 3:
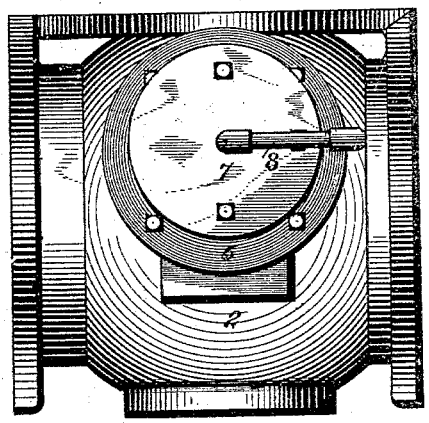

In the accompanying drawings, Figure 1 is a central vertical section of an ordinary globe valve attached to the lower end of a water supply pipe, and having the relief valve attached. Fig. 2 is a top plan view of the same. Fig. 3 is an end elevation looking toward the relief valve.

Referring to the figures on the drawings, 1 indicates a section of a water supply pipe, main or stand pipe, suitably connected to a shell 2, within which is seated the main valve 3 of any suitable and ordinary construction. This valve may be operated by any usual means not necessary to illustrate in the drawings. As ordinarily applied in use if it is suddenly closed the pressure of water at the point of stoppage being proportional to the mass and velocity of the column of water, the shock caused by the pressure, especially if the column of water be large and the velocity great, tends to fracture or strain the pipes. To prevent injury from such causes I provide, preferably at the point of stoppage of the water when shut off, a relief valve of peculiar construction and automatic operation. The component parts of this valve are preferably as follows:

4 indicates a flanged joint or connecting pipe, which may be secured to one side of the shell 2 by screw threads, or any other suitable means, and which through its flange may be secured by bolts to a flanged cylinder 5.

6 indicates a discharge opening in the joint 4, and 7 a cylinder-head bolted to the cylinder, as usual. The head is provided with a screw-threaded opening to receive a screw-threaded end of a pipe 8, which communicates at its other end with the interior of the shell 2, so as to allow the flow of water under pressure from the main through it into the cylinder 5. The pipe 8 is comparatively small, but is provided with a cock 9 for increasing or diminishing the flow of water through it. Within the cylinder 5 is located a longitudinally movable plug, which consists of a valve 10 at one end and at the other end of a piston 11. The remaining portion of the plug preferably consists of a spiral spring 12 within the cylinder interposed between the valve and piston. It is preferably carried on plates 13 and 14 borne respectively upon ball bearing points 15 and 16 upon the adjacent sides of the valve and piston respectively. The spring, in combination with the valve and piston, completes the plug. Within the joint 4 is provided, on a suitable seat, an annular washer 17 of leather, or the like material, and also an annular opening 18 through which water may readily pass from the interior of the shell 2 out through the discharge opening 6. Upon the head of the piston is provided a packing ring 19 which is held in place by a plate 20 and a screw 21 entered into the piston. Around the spring 12 are provided in the sides of the cylinder 5, apertures 22 allowing inspection of the spring, and permitting free motion of the valve. The valve 10 is made of less diameter than the piston, so that equal hydraulic pressure upon each at the same time will force the valve against its seat, overcoming the counter resistance of pressure upon the valve.

In practice the bearing parts of the valve 10 and piston and inclosing cylinder are of course dressed perfectly smooth and even, so that the plug slides freely within the cylinder.

The operation of the device is as follows: While water is flowing freely through the main valve the pressure in the pipe will be at its minimum. At such time the discharge of water from behind the piston 11, through the pipe 8, is permitted, and the pressure being reduced upon the piston, the spring 12 will expand and force the piston back toward the cylinder head. If now the flow of water is suddenly arrested by closing the main valve, the sudden force above referred to will be exerted. But acting against the face of the valve 10 it will force the valve back, compressing the spring 12, and relieving the pressure by a flow of water through the discharge pipe 6. Simultaneously, however, with the arrest of the flow of water through the main valve, and the pressure against the valve 10, an equal pressure will be transmitted through the pipe 8 into the cylinder 5 against the piston. The pressure in the main and upon the piston being equal, and the piston being of larger area than the valve 10, the valve will be forced gradually against its seat, and without shock or jar and shut off the flow of water in the main. When the main valve is again open the pressure is relieved, as above described, the spring 12 expands, forcing the piston toward the cylinder-head and expelling the water from the cylinder through the pipe 8, leaves the spring expanded and ready to perform its function as before.

It will be perceived that if the pressure from the main were suddenly transmitted through the pipe 8, behind the piston, the compression upon the spring 12, between the valve 10 and the piston, might be such as to too greatly diminish the elasticity of the spring, or if the spring were dispensed with that the closing of the valve 10 by the counter pressure on the piston 11 would be too sudden, and the action of the mechanism would be less efficient. I therefore provide the cock 9, whereby the transmission of pressure by the flow of water through the pipe may be accelerated or retarded.

What is claimed is—

1. The combination of a valve case and a plug adapted to open and close the same, said plug consisting of a valve, a piston and an interposed spring, the area of the piston being greater than that of the valve and the heads of the piston and valve, respectively, being opposed to the pressure of liquid to be controlled, substantially as and for the purpose specified.

2. The combination with the main shell and valve, of the relief valve casing, the piston and valve of different area and the interposed spring located therein, a pipe connecting the main shell and casing, the pressure from the main shell and pipes being exerted upon the heads of the piston and valve, respectively, substantially as and for the purpose specified.

3. The combination with the fluid supply pipe, of an automatic relief valve, consisting of a case containing a valve and piston, a spring between the two, and a pipe communicating pressure from the supply pipe behind the piston, substantially as set forth.

4. The combination of a fluid supply pipe and an automatic relief valve, consisting of a case, a plug therein for opening and closing the same, a pipe for communicating pressure from the main behind the plug, and a cock for regulating the velocity of the flow of fluid through the pipe, substantially as set forth.

In testimony of all which we have hereunto subscribed our names.

H. G. VAN EVEREN.
JAMES HENDERSON.

Witnesses:
ANNA L. TABER,
M. J. HUSS.